United States Patent [19]
Toshida et al.

[11] Patent Number: 5,812,227
[45] Date of Patent: Sep. 22, 1998

[54] LIQUID CRYSTAL DEVICE, DISPLAY APPARATUS USING SAME AND DISPLAY METHOD USING SAME

[75] Inventors: Yomishi Toshida, Yokohama; Kazuo Yoshinaga; Toshikazu Ohnishi, both of Machida; Koichi Sato, Atsugi; Takeo Eguchi, Tokyo; Tsuyoshi Shibata, Yokohama, all of Japan

[73] Assignee: Canon Kabushiki Kaisha, Tokyo, Japan

[21] Appl. No.: 41,258

[22] Filed: Apr. 1, 1993

[30] Foreign Application Priority Data

Apr. 2, 1992 [JP] Japan .................................. 4-108474
Jun. 25, 1992 [JP] Japan .................................. 4-190192

[51] Int. Cl.$^6$ .................................................. G02F 1/137
[52] U.S. Cl. .............................. 349/88; 349/10; 349/89; 349/92
[58] Field of Search ............................... 359/51, 52, 103, 359/40, 41; 252/299.01; 349/10, 86, 88, 89, 91, 92; 428/1

[56] References Cited

U.S. PATENT DOCUMENTS

| | | | |
|---|---|---|---|
| 4,411,495 | 10/1983 | Beni et al. | 350/347 V |
| 4,605,284 | 8/1986 | Fergason | 350/334 |
| 4,675,699 | 6/1987 | Kan et al. | 359/103 |
| 4,850,683 | 7/1989 | Kawaguchi et al. | 350/350 R |
| 4,898,454 | 2/1990 | Buckley et al. | 359/52 |
| 5,039,208 | 8/1991 | Ohnishi et al. | 359/100 |
| 5,059,000 | 10/1991 | Kaneko et al. | 350/351 |
| 5,268,783 | 12/1993 | Yoshinaga et al. | 359/52 |
| 5,304,323 | 4/1994 | Arai et al. | 359/52 |
| 5,327,271 | 7/1994 | Takeuchi et al. | 359/51 |
| 5,328,613 | 7/1994 | Beall et al. | 210/500.27 |
| 5,376,302 | 12/1994 | Coates et al. | 359/51 |
| 5,403,510 | 4/1995 | Kajiyama et al. | 359/103 |
| 5,410,424 | 4/1995 | Konuma et al. | 359/51 |
| 5,475,515 | 12/1995 | Yoshinaga et al. | 349/89 |

FOREIGN PATENT DOCUMENTS

| | | |
|---|---|---|
| 0343903 | 11/1989 | European Pat. Off. . |
| 0357234 | 3/1990 | European Pat. Off. . |
| 56-011436 | 2/1981 | Japan . |
| 58-501631 | 9/1983 | Japan . |
| 61-502128 | 9/1986 | Japan . |
| 63-271233 | 11/1988 | Japan . |
| 63-278036 | 11/1988 | Japan . |
| 01198725 | 8/1989 | Japan . |
| 01225924 | 9/1989 | Japan . |
| 02280120 | 11/1990 | Japan . |
| 04081716 | 3/1992 | Japan . |
| WO 04262 | 9/1985 | WIPO . |

Primary Examiner—William L. Sikes
Assistant Examiner—Tai V. Duong
Attorney, Agent, or Firm—Fitzpatrick, Cella, Harper & Scinto

[57] ABSTRACT

The liquid crystal device is constituted by disposing a display layer between a pair of electrode plates. The display layer comprises a porous polymer material having open pores partially filled and a low-molecular weight mesomorphic compound impregnating the porous polymer material. The display layer is free from an unfilled portion of the low-molecular weight mesomorphic compound to be effective for providing a liquid crystal device showing a high transmittance and a good contrast. The display layer also comprises a three dimensional network structure coated with a polymer layer, and a low-molecular weight mesomorphic compound impregnating the three-dimensional network structure. The display layer is free from a fibrous part which is unstable against an applied voltage to be effective for providing a liquid crystal device showing no hysteresis.

15 Claims, 5 Drawing Sheets

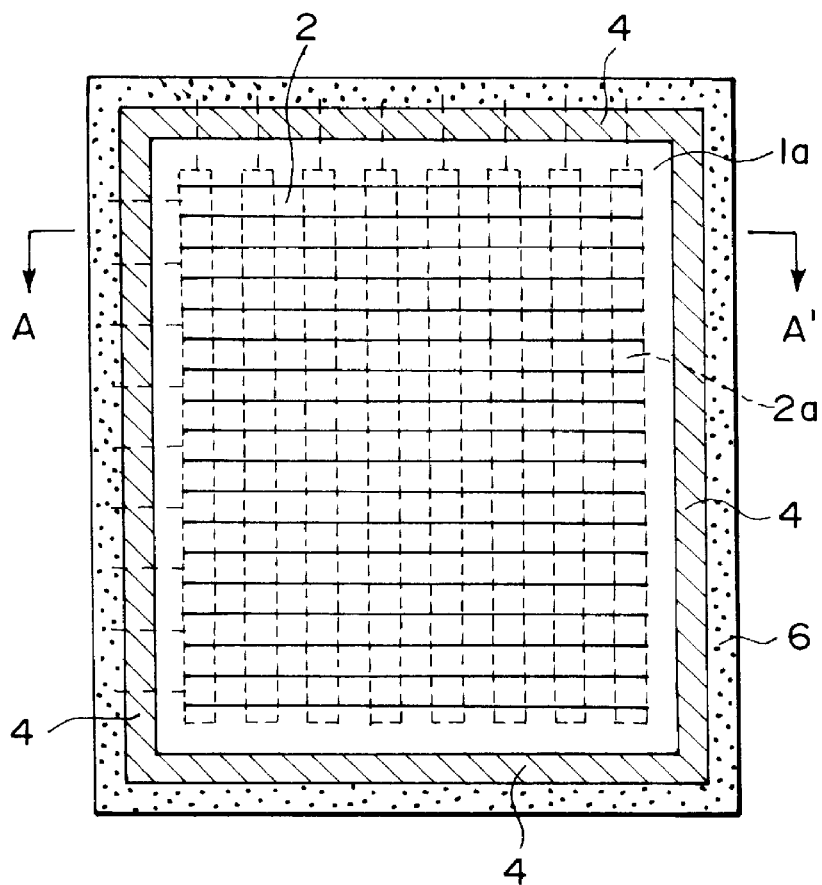
F I G. 3A
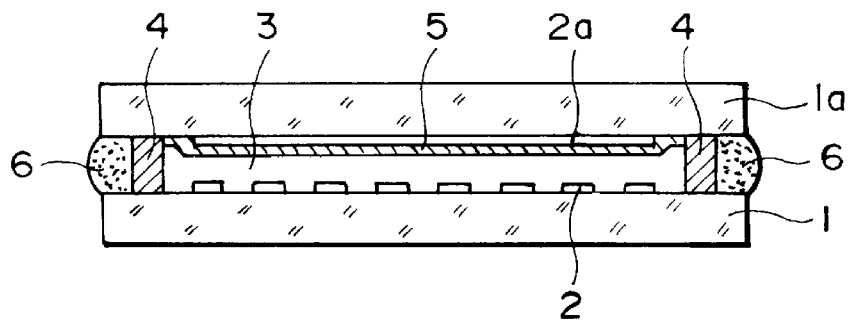
F I G. 3B

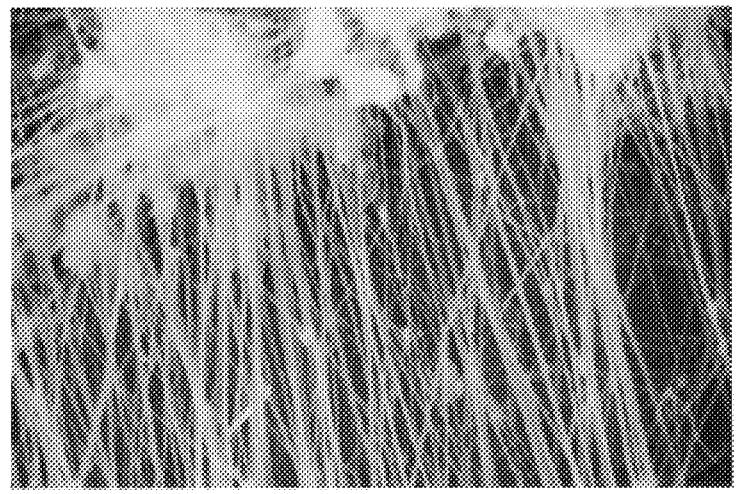
(×5,000) 5μm
F I G. 5 A
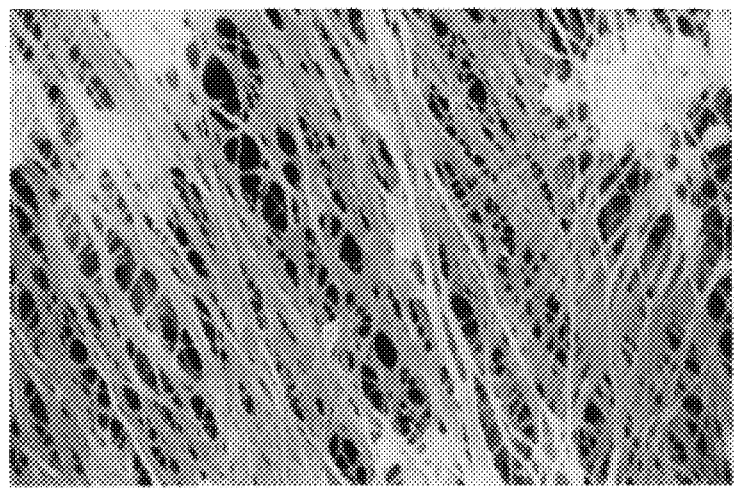
(×5,000) 5μm
F I G. 5 B

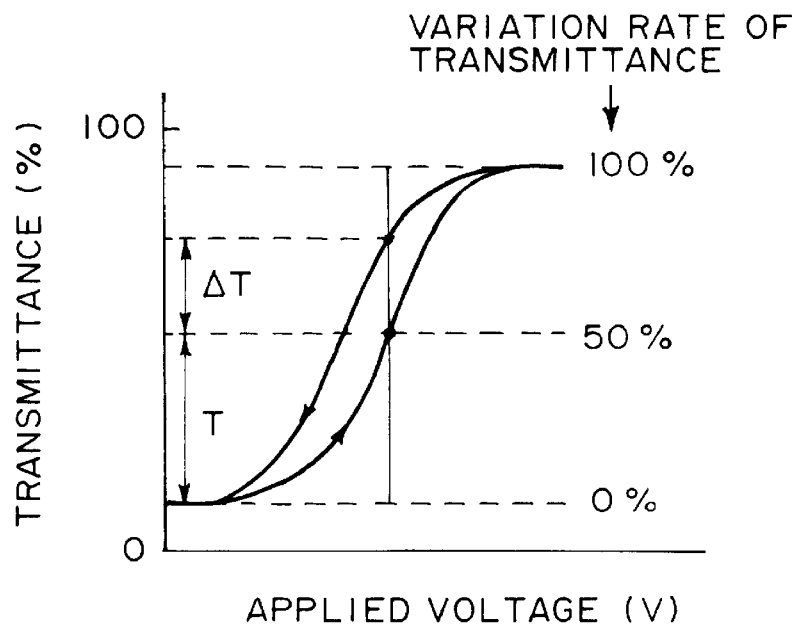
F I G. 6
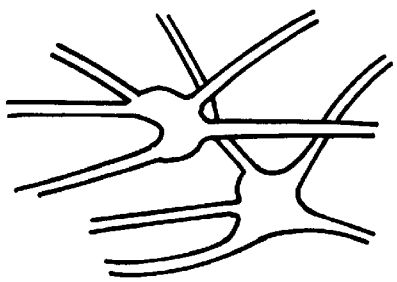
F I G. 7A
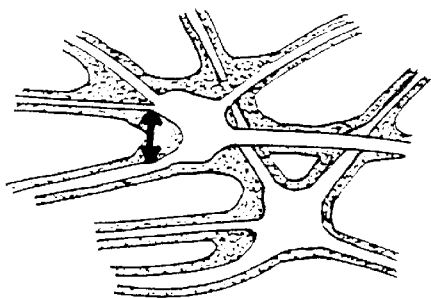
F I G. 7B

LIQUID CRYSTAL DEVICE, DISPLAY APPARATUS USING SAME AND DISPLAY METHOD USING SAME

FIELD OF THE INVENTION AND RELATED ART

The present invention relates to a thermo-optical and electro-optical display device utilizing transmitted light and scattered light, particularly to a liquid crystal device containing a display layer comprising a specific polymer material and a low-molecular weight mesomorphic compound, a display apparatus using the device and a display method using the device.

Liquid crystal materials have been used for various thermo-optical and electro-optical display devices. There has been known liquid crystal display device using twisted nematic (TN)-type liquid crystals, ferroelectric liquid crystals, etc.

These liquid crystal display devices, however, have encountered many technical problems such as complicated production step for providing a large display area, deformation of a substrate and a deterioration in an image quality. In addition, these liquid crystal display devices theoretically require a polarizer in any case where direct vision-type display devices or a projection-type display devices are used, thus resulting in a decreased utilization of light.

On the other hand, there have also been known phase transition-type liquid crystal display devices using cholesteric liquid crystals and liquid crystal display devices utilizing a dynamic scattering effect of nematic liquid crystals which have not required a polarizer, thus being excellent in utilization of light and a view angle. These display device, however, have encountered the same technical problems those as described above, in addition to a problem of a large driving voltage.

In order to solve the above problems, there have been proposed a display device utilizing a capsulated nematic liquid crystal as disclosed in Japanese Laid-Open Patent Application (JP-A) (KOHYO) No. 501631/1983 by J. L. Fergason and an optical modulation material comprising a liquid crystal droplet dispersed in an epoxy resin as disclosed in JP-A (KOHYO) No. 502128/1986. These have been advantageous to large picture area display devices but have involved a problem that a large driving voltage is required. There have also been proposed liquid crystal display devices utilizing a photocurable or photopolymerizable compound as a support or matrix as disclosed in Japanese Laid-Open Patent Application (JP-A) (KOKAI) Nos. 271233/1988, 278036/1988, 198725/1989. These display devices have readily provided a large picture area and have decreased a driving voltage.

The above-mentioned polymer dispersed or impregnated-type liquid crystal devices have advantages such that it is possible to obtain a sufficient contrast in combination with a schlieren optical system since light utilization of a light source is higher compared with conventional liquid crystal display devices to provide a high transmittance and such that a cell structure is simplified. Such polymer dispersed-type liquid crystal devices are, for example, constituted by a laminar structure in which a display layer formed by dispersing a liquid crystal in a polymer matrix is disposed between a pair of substrates having thereon a transparent electrode to be applied to an electric field. Under no electric field application, liquid crystal molecules have a random orientation to-scatter incident light, whereby the display layer is in a scattering state. Under electric field application, liquid crystal molecules align with a direction parallel to the direction of the applied electric field. At this time, if an ordinary refractive index of the liquid crystal substantially equals to a refractive index of the polymer matrix, incident light passes through the display device since the display layer is in a transparent state.

As the above-mentioned polymer matrix, there have been proposed a liquid crystal display member using a porous film (JP-A (KOKAI) No. 11436/1981), a display cell using a porous film (U.S. Pat. No. 4,411,495) and a liquid crystal display device utilizing a porous film (JP-A (KOKAI) No. 280120/1990). By using the porous film, it has been possible to obtain a flexible display layer and a liquid crystal display device with a good reproducibility. In order to impregnate or fill a porous film with a liquid crystal material, the porous film has generally been dipped in the liquid crystal material or a solution of the liquid crystal material in an appropriate solvent. At this time, the liquid crystal material has failed to impregnate or fill a minute pore portion since the porous film has been constituted by a fibrous part and open pores having considerably small pore diameter, thus leaving an unfilled portion of the liquid-crystal material to cause light scattering thereby to decrease a light transmittance. In some cases, the minute pore portion has been impregnated or filled with a liquid crystal material. However, in such cases, the liquid crystal material at the minute pore portion has failed to respond to an applied electric field to decrease a light transmittance, thus resulting in a low contrast.

In the above-mentioned conventional polymer impregnated-type liquid crystal display devices using the porous film, a minute fibrous part having a diameter of 0.05 $\mu$m or below has been liable to be generated because control of a uniform diameter of fibrous matrix constituting a three-dimensional network structure has been difficult when the porous polymer film has been formed by stretching, particularly in order to obtain a porosity of at least 80%. In this instance, there has been liable to generate a terminal fibrous part having a free end in the form of a whisker, i.e., a part at which the three-dimensional network structure has been partially destroyed to fail to connect other fibrous parts. When an electric field is applied to such liquid crystal devices containing a display layer comprising the three-dimensional network structure having the minute fibrous part having a diameter of at most 0.05 $\mu$m and/or the terminal fibrous part having a free end constituting a matrix, such a minute fibrous part and/or terminal fibrous part is moved under the influence of an electric field response of liquid crystal molecules, thus being apt to invite a hysteresis phenomenon with respect to an applied voltage-light transmittance characteristic. As a result, the conventional liquid crystal display devices has encountered a problem that a gradation display cannot readily be effect, thus being desired to bring about further improvements.

Similarly, the conventional polymer dispersed-type liquid crystal display devices have encountered a problem of the hysteresis phenomenon due to a part to be moved readily, e.g., an isolated matrix part and/or a film-like part having a free end, resulting from a difficulty in controlling a diameter of a polymer matrix when a content of a liquid crystal has been increased.

SUMMARY OF THE INVENTION

The present invention has been accomplished in order to remedy the above-mentioned drawbacks of the conventional liquid crystal devices.

An object of the present invention is to provide a polymer dispersed-type or polymer impregnated-type liquid crystal display device containing a display layer free from an unfilled portion of a low-molecular weight mesomorphic compound, thereby to improve a light transmittance and contrast.

Another object of the present invention is to provide a liquid crystal device containing a display layer comprising a three-dimensional network structure having a high strength and porosity and free from an unstable part against a response of a low-molecular weight mesomorphic compound to an applied electric field, thereby to decrease a hysteresis phenomenon and increase a contrast.

A further object of the present invention is to provide a display apparatus and a display method employing the liquid crystal devices described above.

According to a first aspect of the present invention, there is provided a liquid crystal device, comprising: a pair of electrode plates each comprising a substrate and an electrode thereon, and a display layer disposed between the electrode plates; wherein the display layer is formed by impregnating a porous polymer material having open pores with a low-molecular weight mesomorphic compound, the open pores having been partially filled.

According to a second aspect of the present invention, there is provided a liquid crystal device, comprising a pair of electrode plates each comprising a substrate and an electrode thereon, and a three-dimensional network structure, a polymer layer and a low-molecular weight mesomorphic compound disposed between the electrode plates; wherein the three-dimensional network structure is coated with the polymer layer.

According to the present invention, there is further provided a liquid crystal device, comprising: a pair of electrode plates each comprising a substrate and an electrode thereon, and a display layer disposed between the electrode plates; wherein the display layer is formed by impregnating a porous polymer material having open pores with a low-molecular weight mesomorphic compound and a material having a solubility parameter of at least 12 $(cal/cm^3)^{1/2}$.

The present invention provides a display apparatus, including: a display device described above; means for applying voltage to the display device; means for illumination the display device with light, thereby separating the light into transmitted light and scattered light; and means for projecting the transmitted light passed through the display device onto a projection image-receiving member.

The present invention also provides a display method, comprising: illuminating a display device described above with light; applying voltage to the display device; and projecting transmitted light obtained by passing the light through the display device to effect display.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3A is a schematic plan view of the liquid crystal device of the present invention, and FIG. 3B is schematic A—A' line-sectional view of the device shown in FIG. 3A.

FIG. 5A is a photograph of a three-dimensional network structure before coating of a polymer film by means of a scanning electron microscope (SEM: magnification of 5,000) and FIG. 5B is a photograph of a three-dimensional network structure having been coated with the polymer film by means of the SEM (magnification of 5,000).

FIG. 6 is an explanatory view showing a hysteresis characteristic with respect to an applied voltage and a transmittance.

FIG. 7A is a schematic view of a porous polymer film material before filling of open pores and FIG. 7B is a schematic view of the porous polymer film material after filling of the open pores.

DETAILED DESCRIPTION OF THE INVENTION

Hereinbelow, the present invention will be explained in detail with reference to the drawings.

First, the liquid crystal device of the first aspect of the present invention will be explained.

Figure 1:
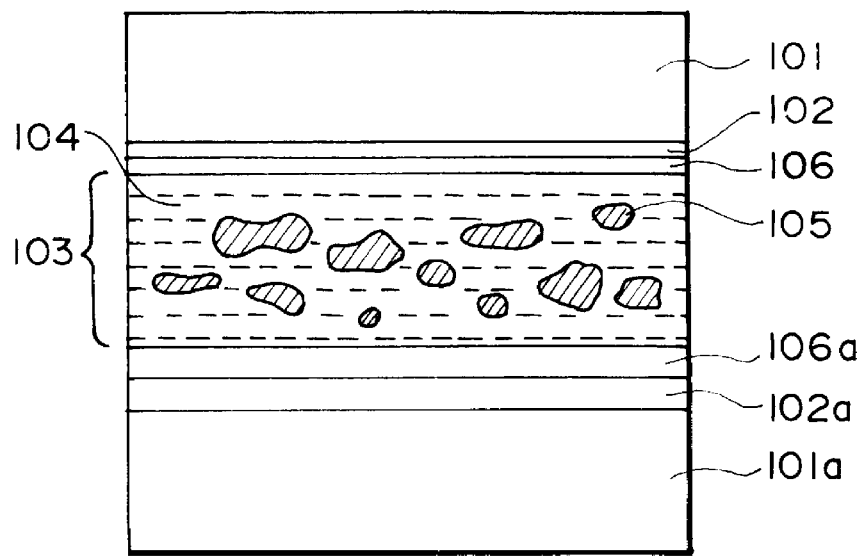
FIG. 1 is a schematic sectional view showing an embodiment of the liquid crystal device according to the present invention.

FIG. 1 is a schematic sectional view of an embodiment of the liquid crystal device of the present invention for explanation of the structure thereof.

Referring to FIG. 1, the liquid crystal device includes a display layer 103 comprising a low-molecular weight mesomorphic compound 105 and a porous polymer material 104 having open pores which have been partially filled. The display layer 103 is disposed between a pair of substrates 101 and 101a each having thereon an electrode 102 or 102a and an optional adhesive layers 106 and 106a in this order.

Each of the substrates 101 and 101a may comprise glass or plastics, e.g., in the form of plate or film.

Examples of a polymer film used as the substrate may include: a low-density polyethylene film, a high-density polyethylene film (such as "Hibron", a product of Mitsui Toatsu Kagaku K.K.), a polyester film (such as "Torefan", a product of Toray K.K.), a polyester film (such as "Myler", a product of Du Pont), a polyvinyl alcohol film (such as "Hicellon", a product Nihon Gosei Kako K.K.), a polyamide film (such as "Rayfan", product of Toyo Gosei Film K.K.), a polycarbonate film (such as "Teijin Panlight", a product of Teijin K.K.) a polyimide film (such as "KAPTON", a product of Du Pont), a polyvinyl chloride film (such as "Hishilex", a product of Mitsubishi Jushi K.K.), a polytetrafluoroethylene film (such as "Teflon", a product of Mitsui Fluorochemical K.K.), a polyacrylate film (such as "Sumilate", a product of Sumitomo Bakelite K.K.), a polystyrene film (such as "Styrosheet", a product of Asahi Dow K.K.), a polyvinylidene chloride film (such as "Saran Film", a product of Asahi Dow K.K.), a cellulose film, and a polyvinylidene fluoride film (such as "Tedler", a product of Du Pont).

The electrodes 102 and 102a formed on the substrates may include a transparent electrode comprising ITO (indium-tin-oxide) or $SnO_2$, and a metal film comprising Al, Au, Ag, Cu or Cr. It is possible to use the electrodes as an electrode and a reflective layer in a reflection-type display device. The thus prepared substrates with the electrodes may be inclusively referred to herein as "electrode plates".

In the embodiment, the display layer 103 disposed between the electrode plates comprises a porous polymer material 104 and a low-molecular weight mesomorphic compound 105 impregnating the porous polymer material 104. The display layer 103 may be prepared in the following manner. A porous polymer material is applied onto an electrode plate and then the surface of the porous polymer material is applied onto another electrode plate. After sealing the periphery of the above-prepared cell, the porous polymer material is impregnated or filled with a low-molecular weight mesomorphic compound. The thickness of the display layer 103 may generally be 1–50 microns, preferably 3–30 microns. Below 1 micron, it is difficult to obtain sufficient contrast. On the other hand, above 50 microns, it is difficult to drive the liquid crystal device at high speed as a large driving voltage is required.

Examples of materials used for the porous polymer material 104 may include: polyethylene terephthalate, polycarbonate, polyamide, polymethyl methacrylate, methyl methacrylate-styrene copolymer, polystyrene, styrene-acrylonitrile copolymer, polypropylene, low-density polyethylene, high-density polyethylene, polyvinyl chloride, polytetrafluoro-ethylene, polychlorotrifluoroethylene, ethylene fluoride-propylene copolymer, polyacrylate, polysulfone, cellulose, and polyether ether ketone.

The porous polymer material 104 may be formed by various methods, such as, a method of forming a polymer film containing a substance to be eluted (or removed) and then eluting the substance from the polymer film; a method of sintering or molding (or forming) polymer particles to modify a gap between the particles into pores; a method of embossing a polymer film and then stretching the film; a method of stretching stepwise a crystalline polymer film to generate pores; a method of damaging a polymer by radiation and etching the polymer with a solvent to form pores; and a combination of these methods.

Examples of a porous polymer material 104 may include: Hipore 1000, 2000, 3000, 4000 (manufactured by Asahi Kasei Kogyo K.K.); KT-50, LE-85, Duracard, Excepole (manufactured by Mitsubishi Kasei K.K.); Celpore (manufactured by Sekisui Kasei Kogyo K.K.); and Fluoropore (manufactured by Sumitomo Denki Kogyo K.K.). However, the porous polymer material is not restricted to the above examples.

The porous polymer material 104 used in the present invention comprises minute fibers and open pores. The minute fibers are liable to cross each other at arbitrary positions and are fixed or fused together to form a knotted or knobbed part (herein, reference to as "node"), e.g., when the open pores are formed by pressing polymer film particles to provide a sheet and stretching the sheet. In other words, nodes are connected by a fibrous part (herein, referred to as "fibril") and fibrils are connected to each other to form a node.

In the present invention, the open pores of porous polymer material has been filled. In a preferred embodiment, a neighborhood of the node at which a pore diameter becomes small (particularly, 0.5 μm or below) is filled with a filling substance.

Herein, a pore diameter means a distance between two adjacent fibrils connected to each other at a node. More specifically, FIG. 7A shows a partially enlarged schematic view of a porous polymer material before filling of a minute pore portion and FIG. 7B shows a partially enlarged view of the porous polymer material after filling of a minute pore portion. Referring to FIG. 7B, a distance between two fibrils indicated by an arrow denotes a pore diameter to be filled with a filling substance. In the present invention, the pore diameter may be determined by measuring a distance between two fibrils at arbitrary or prescribed positions under observation with an SEM and calculating an average value of measured values. The minute pore portion may include a part of a relatively large pore and an entire pore having a small pore diameter (e.g., 0.5 μm or below).

The thus-filled porous polymer material having open pores is substantially free from minute pores, thus decreasing an unfilled part of a low-molecular weight mesomorphic compound to be contained in the porous polymer material to improve a light transmittance of a resultant liquid crystal device.

A method of filling the porous polymer material with the filling substance may include: a polymerization wherein a prescribed amount of a known monomer component, such as a monomer or halogenated monomer having an unsaturated double bond, in the state of liquid or a solution is introduced into minute pores and then is subjected to heating or exposure to visible rays, ultraviolet rays, electron rays, etc.; a plasma polymerization using known gaseous hydrocarbons, gaseous halogenated hydrocarbons, etc.; and coating with a solution of a known polymer in an appropriate solvent. In the above filling method, it is required to appropriately select introducing or feeding conditions of the filling substance used, such as temperature, time, or solution concentration, of the monomer component or gaseous hydrocarbon used since a large amount of the monomer component, etc. leads to an increased filling amount to result in a decrease in a low-molecular weight mesomorphic compound content. A pore diameter of the open pores to be filled may preferably be at most 0.5 μm, more preferably at most 0.3 μm. When the pore diameter exceeds 0.5 μm, an amount of the low-molecular weight mesomorphic compound to be contained in the porous polymer material is decreased, thus lowering optical characteristics such as a transmittance and a contrast and increasing a driving voltage.

In the present invention, the filling substance filling the minute pore portion of the porous polymer material may preferably have a solubility parameters δ (SP) of at least 12 $(cal/cm^3)^{1/2}$, particularly at least 13 $(cal/cm^3)^{1/2}$. The filling substance having a solubility parameter of at least 12 $(cal/cm^3)^{1/2}$ may for example include the following polymers and their derivatives.

| Polymer | δ $(cal/cm^3)^{1/2}$ |
|---|---|
| Cellulose | 16 |
| Polyvinyl alcohol | 13 |
| Nylon | 13 |
| Polyacrylic acid | 13 |

The above polymers having a large SP (i.e., at least 12 $(cal/cm^3)^{1/2}$) has a large number of a polar group, thus lowering their volume resistances to decrease a driving voltage or a threshold voltage of a resultant liquid crystal device.

A value of the solubility parameter used in the present invention is identical to one, for example, shown in "Solubility Parameter Values" (Polymer Hand Book, 3rd Edition, chapter VII). With respect to a polymer not shown in the Polymer Hand Book, it is possible to obtain a solubility parameter δ by the following equation:

$$\delta=[(\Delta H-R \cdot T)/V]^{1/2},$$

wherein ΔH denotes heat of vaporization, R denotes gas constant, T denotes a temperature (° K), and V denotes molar volume. Further, ΔH may be obtained from a boiling point.

In another embodiment of the first aspect of the present invention, a liquid crystal device, comprising: a pair of electrode plates each comprising a substrate and an electrode thereon, and a display layer disposed between the electrode plates; wherein the display layer is formed by impregnating a porous polymer material having open pores with a low-molecular weight mesomorphic compound and a material having a solubility parameter of at least 12 $(cal/cm^3)^{1/2}$ may employed.

A porosity of the porous polymer material is an important factor in view of an increase in a content of the low-molecular weight mesomorphic compound. Herein, the porosity is obtained through the following equation of:

$$\text{Porosity (\%)} = [(X - Y)/(\text{volume of polymer material}) \times (\text{specific gravity of liquid})] \times 100 \quad (1)$$

wherein X denotes a weight of a polymer film impregnated or filled with a liquid having a known specific gravity and Y denotes a weight of the porous polymer material alone.

In the present invention, the porosity of the porous polymer material may be 80–98%, preferably 85–95%. Below 80%, a contrast is insufficient. On the other hand, above 98%, it is difficult to prepare a large-area liquid crystal device due to a low strength of the porous polymer material.

In the display layer of the present invention, a diameter of a fibrous portion of the porous polymer material (i.e., a diameter inclusive of a fibril diameter and a thickness of a filling substance) may be 0.05–3 μm, more preferably 0.1–2 μm. Below 0.05 μm, a hysteresis phenomenon is liable to occur. Above 3 μm, a contrast is undesirably decreased.

Then, specific examples of the low-molecular weight mesomorphic compound (i.e. 105 in FIG. 1 and 106 in FIG. 2) used in first and second aspects of the present invention may include those represented by the following structural formulas, which are shown below together with phase transition characteristics.

Herein, the respective symbols denote the following phases:

Cryst.: crystal,

SmC*: chiral smectic C phase,

SmA: smectic A phase,

SmB: smectic B phase,

SmC: smectic C phase,

SmE: smectic E phase,

SmF: smectic F phase,

SmG: smectic G phase,

Sm3: un-identified smectic phase,

Ch.: cholesteric phase,

N: nematic phase, and

Iso.: isotropic phase.

Chiral smectic mesomorphic compound

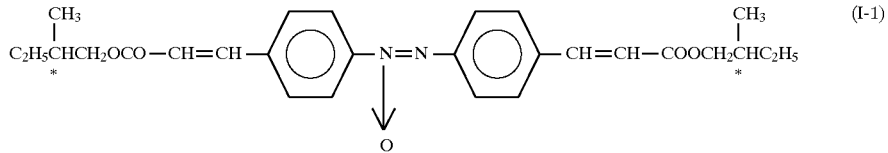

4,4-azoxycinnamic acid-bis(2-methylbutyl)ester

Cryst. $\xrightarrow{121° C.}$ SmC* $\xrightarrow{134° C.}$ SmA $\xrightarrow{168° C.}$ Iso.

(I-1)

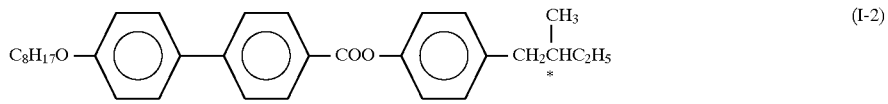

4-(2'-methylbutyl)phenyl-4'-octyloxybiphenyl-4-carboxylate

Cryst. $\xrightarrow{78° C.}$ Sm3 $\xrightarrow{80° C.}$ SmC* $\xrightarrow{128.3° C.}$ SmA $\xrightarrow{171° C.}$ Ch. $\xrightarrow{174.2° C.}$ Iso.

(I-2)

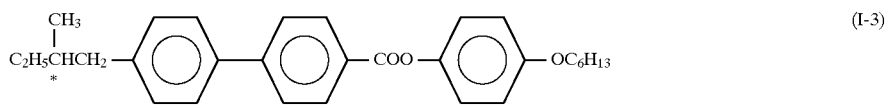

4-hexyloxyphenyl-4-(2"-methylbutyl)biphenyl-4'-carboxylate

Cryst. $\xrightarrow{68.8° C.}$ SmC* $\xrightarrow{80.2° C.}$ Ch. $\xrightarrow{163.5° C.}$ Iso.

(I-3)

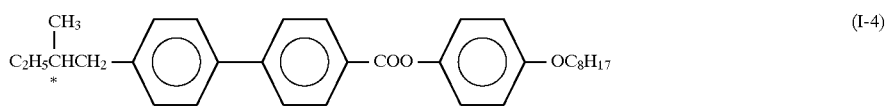

4-octyloxyphenyl-4-(2"-methylbutyl)biphenyl-4'-carboxylate (I-4)

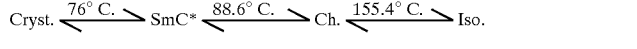
 (I-5)
4-heptylphenyl-4-(4"-methylhexyl)biphenyl-4'-carboxylate
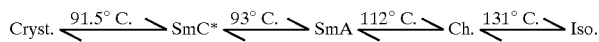
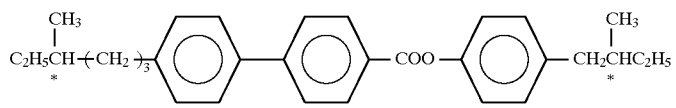
 (I-6)
4-(2"-methylbutyl)phenyl-4-(4"-methylhexyl)-biphenyl-4'-carboxylate
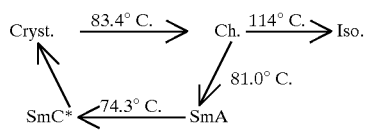
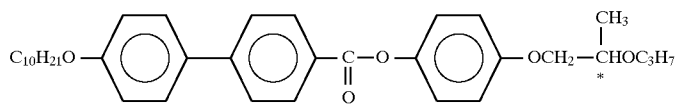
 (I-7)
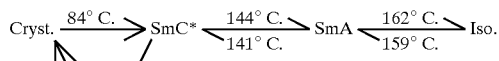
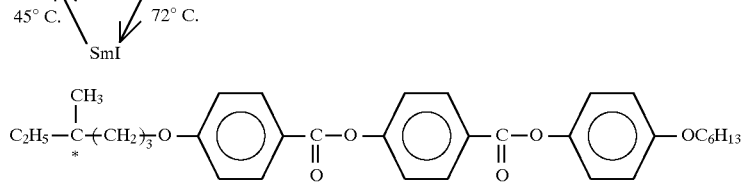
 (I-8)
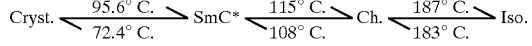
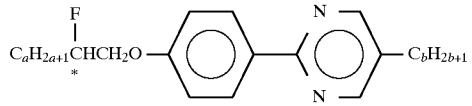
 (I-9)
a = 4 – 12,
b = 8 – 16
(Case where a = 6, b = 12)
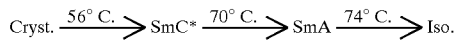
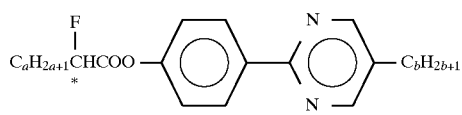
 (I-10)
a = 4 – 12,
b = 8 – 16
(Case where a = 8, b = 10)
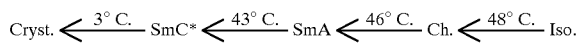

-continued

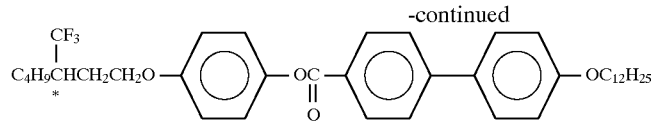 (I-11)

Cryst. $\xrightarrow{58° C.}$ SmC* $\xrightarrow{120° C.}$ SmA $\xrightarrow{146° C.}$ Iso.

Non-chiral smectic mesomorphic compound

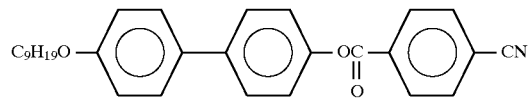 (I-12)

4'-n-nonyloxy-4-biphenylyl-4-cyanobenzoate

Iso. $\longrightarrow$ N. $\longrightarrow$ SmC

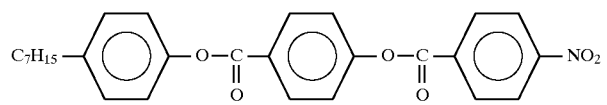 (I-13)

4-n-heptylphenyl-4-(4'-nitrobenzoyloxy)benzoate

Iso. $\longrightarrow$ N. $\longrightarrow$ SmA

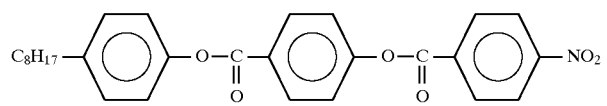 (I-14)

4-n-octylphenyl-4-(4'-nitrobenzoyloxy)benzoate

Iso. $\longrightarrow$ N. $\longrightarrow$ SmA $\longrightarrow$ SmC

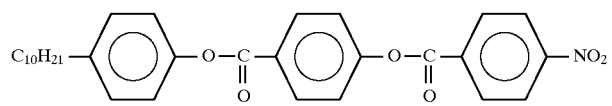 (I-15)

4-n-decylphenyl-4-(4'-nitrobenzoyloxy)benzoate

Iso. $\longrightarrow$ N. $\longrightarrow$ SmA $\longrightarrow$ SmC

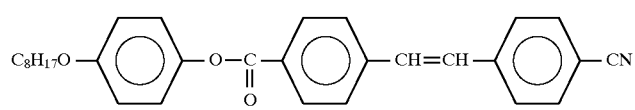 (I-16)

trans-4-(4''-octyloxybenzoyloxy)-4'-cyanostilbene

Iso. $\longrightarrow$ SmA$_1$ $\longrightarrow$ N. $\longrightarrow$ SmA$_2$

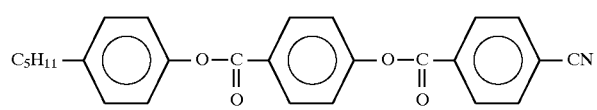 (I-17)

4-n-pentylphenyl-4-(4'-cyanobenzoyloxy)benzoate

Iso. $\longrightarrow$ N. $\longrightarrow$ SmA

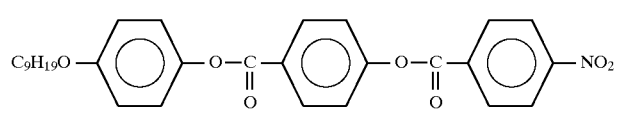 (I-18)

4-n-nonyloxyphenyl-4-(4'-nitrogenzoyloxy)benzoate

Iso. $\longrightarrow$ N. $\longrightarrow$ SmA $\longrightarrow$ SmC

-continued

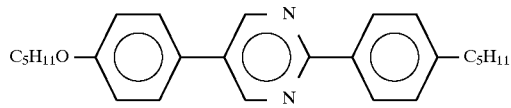
(I-19)

2-(4'-n-pentylphenyl)-5-(4"-n-pentyloxyphenyl)-pyrimidine

Iso. ⟶ SmA ⟶ SmC ⟶ SmF ⟶ SmG

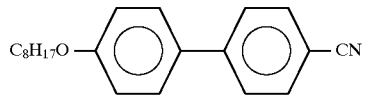
(I-20)

4-cyano-4'-n-octyloxybiphenyl

Iso. ⟶ N. ⟶ SmA

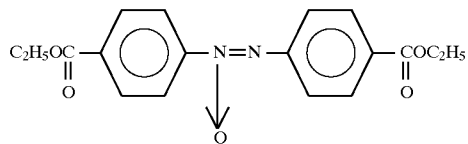
(I-21)

diethyl p,p'-azoxydibenzoate

Iso. ⟶ SmA

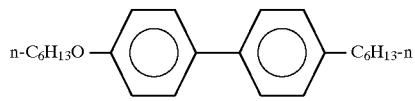
(I-22)

4-n-hexyl-4'-n-hexyloxybiphenyl

Iso. ⟶ SmB ⟶ SmE

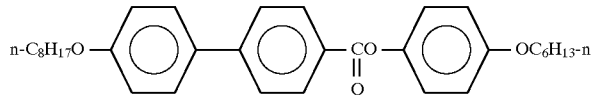
(I-23)

4-n-hexyloxyphenyl-4'-n-octyloxybiphenyl-4-carboxylate

Iso. ⟶ N. ⟶ SmA ⟶ SmC ⟶ SmB

(I-24)

di-n-octy-4,4"-terphenyl dicarboxylate

Iso. ⟶ SmA ⟶ SmC

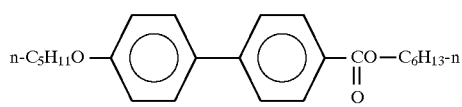
(I-25)

n-hexyl-4'-n-pentyloxybipenyl-4-carboxylate

Iso. ⟶ SmA ⟶ SmB ⟶ SmE

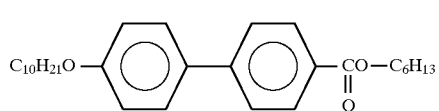
(I-26)

4-n-hexyl-4'-n-decyloxybiphenyl-4-carboxylate

Iso. ⟶ SmA ⟶ SmC

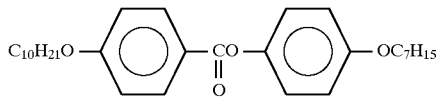 (I-27)

4-n-heptyloxyphenyl-4-n-decyloxybenzoate

Iso. ⟶ SmA ⟶ SmC

Nematic mesomorphic compound (or nematic liquid crystal)

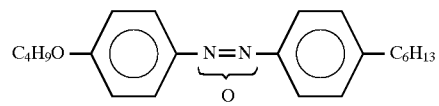 (I-28)

4-hexyl-4'-butyloxyazobenzene

Iso. ⇌ 90° C. N. ⇌ 27° C. Cryst.

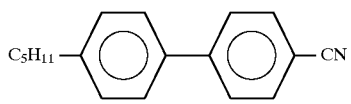 (I-29)

4-cyano-4'-pentylbiphenyl

Iso. ⇌ 35° C. N. ⇌ 24° C. Cryst.

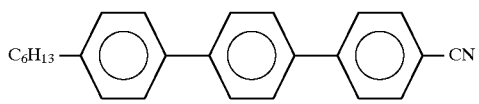 (I-30)

4-cyano-4-hexylterphenyl

Iso. ⇌ 228° C. N. ⇌ 125° C. Cryst.

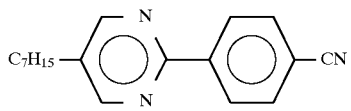 (I-31)

heptylcyanophenyl pyrimidine

Iso. ⇌ 50° C. N. ⇌ 44° C. Cryst.

Z-1625 (mfd. by Merck Co.) (I-32)

Nematic temperature range = −10 to 60° C.

E-7 (mfd. by BHD Co.) (I-33)

Nematic temperature range = −10 to 60° C.

R-200 (mfd. by Rosch Co.) (I-34)

Nematic temperature range = 0 to 65° C.

D-X01A (mfd. by Dainippon Ink K.K.) (I-35)

Nematic temperature range = −26 to 68° C.

ZLI-2008 (mfd. by Merck Co.) (I-36)

$T_{cl}$ (clearing point) = 64° C.

Sm ⟶ <−20° C. N

ZLI-1840 (mfd. by Merck Co.) (I-37)

$T_{cl}$ (clearing point) = 90° C.

Sm 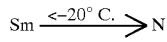 N

TN403 (mfd. by Dainippon Ink K.K.) (I-38)

$T_{cl}$ = 82° C.

Sm 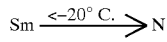 N

E7 (mfd. by EM Chemicals Co.) (I-39)

In the present invention, a nematic mesomorphic compound (or liquid crystal) having a positive dielectric anisotropy may preferably be used as the low-molecular weight mesomorphic compound.

Hereinbelow, the liquid crystal device of the second aspect of the present invention will be explained.

The liquid crystal device of the second aspect of the present invention is characterized by a display layer comprising a three-dimensional network structure coated with a polymer layer and a low-molecular weight mesomorphic compound impregnating or filling the above-coated three-dimensional network structure.

The three-dimensional network structure has a property of changing an orientation state of liquid crystal molecules of the mesomorphic compound into a random orientation state, e.g., under no voltage application, thus scattering incident light. A porosity of the three-dimensional network structure may preferably be high in view of improvements in a light transmittance, a threshold voltage and a contrast. In a conventional liquid crystal device including a porous material having a high porosity (i.e., a high liquid crystal content), however, has encountered a problem of a decrease in strength, thus resulting in a large hysteresis and a low contrast.

The three-dimensional network structure of the present invention has an improved strength since a polymer layer is formed on the surface of the three-dimensional network structure to reinforce a low strength part, particularly a fibrous part having a diameter of at most 0.05 μm, and an unstable part having a free end. As a result, the three-dimensional network structure has a sufficient strength and free from an unstable part having a free end while retaining a high porosity due to a small thickness of the polymer layer. A thickness of the polymer layer may preferably be 0.2–2 μm, more preferably 0.2–1 μm. Below 0.2 μm, a sufficient strength of the three-dimensional network structure fails to obtain. Above 2 μm, a liquid crystal content of the display layer is undesirably decreased to lower a light transmittance and a contrast.

In the present invention, a thickness of a polymer layer may be obtained by a difference in an average diameter of a fibrous part after coating and an average diameter of a fibrous part before coating. More specifically, FIG. 5A is a photograph of a three-dimensional network structure before coating of a polymer film by means of a scanning electro microscope (SEM: magnification of 5,000) and FIG. 5B is a photograph of a three-dimensional network structure having been coated with the polymer film by means of the SEM (magnification of 5,000). In each FIGS. 5A and 5B, a diameter of a fibrous part is measured at prescribed or arbitrary positions (e.g., 10 points) and the same measurement is effected under observation of other sections (e.g., 10 sections). It is possible to determine a thickness of the polymer layer by subtracting an average value of measured diameters before coating from an average value of measured diameters after coating.

In a preferred embodiment, the three-dimensional network structure may preferably include a porous polymer film having a porosity of 80–98%, particularly 85–95% and also having a fibrous part having a diameter of 0.05 μm or below.

In order to provide a polymer layer having a sufficient strength, materials for such a polymer layer may be selected from high-molecular weight polymeric materials, i.e., polymers having a polymerization degree of 400–2000 since polymers having a polymerization degree of below 400 fails to provide a sufficient strength and polymers having a polymerization degree of above 20000 has a poor processability. The materials for the polymer layer may preferably include the above-mentioned filling substance having a solubility parameter of at least 12 $(cal/cm^3)^{1/2}$, particularly at least 13 $(cal/cm^3)^{1/2}$ used in the embodiment according to the first aspect of the present invention. The polymer layer may be formed by dipping a three-dimensional network structure in a solution of a polymer in an appropriate solvent and then drying to remove the solvent. The polymer layer may also be formed by impregnating a three-dimensional network structure with a polymerizable composition and drying, and after drying or simultaneously with drying, polymerizing or curing the polymerizable composition. The thus-prepared coated three-dimensional network structure may be ground by a grinder, as desired. At this process, it may optionally add an appropriate plasticizer.

The polymer for the polymer layer may preferably have a modulus in tension of $0.2 \times 10^4$–$20 \times 10^4$ kg/cm², more preferably $0.3 \times 10^4$–$15 \times 10^4$ kg/cm².

A modulus in tension of a polymer may readily be obtained through a formula shown below based on data from a stress-strain curve of a tensile test according to test methods such as JIS K6723, K6745 and K6911, and ASTM D638 depending on a polymer used.

Modulus in tension=PL/AΔl (Kg/cm²), wherein P denotes a load (kg) at a time of an elongation Δl, L denotes a distance (cm) between standard lines, A denotes a cross section (cm²) of a test piece, and Δl denotes an elongation between standard lines.

Hereinbelow, the liquid crystal device of the second aspect of the present invention will be explained with reference to FIG. 2.

Figure 2:
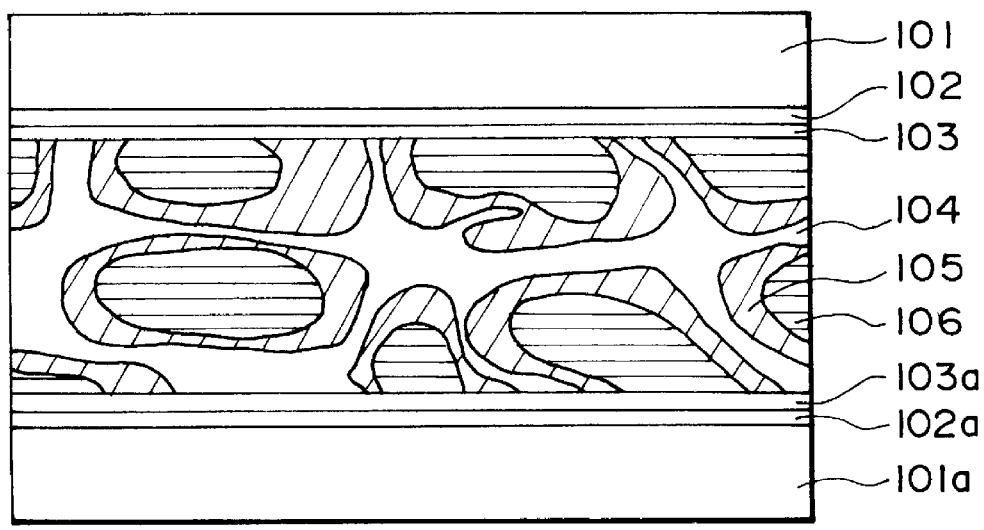
FIG. 2 is a schematic sectional view showing another embodiment of the liquid crystal device of the present invention.

FIG. 2 is a schematic sectional view showing an embodiment of the liquid crystal device of second aspect of the present invention for explanation of the structure thereof.

Referring to FIG. 2, the liquid crystal device includes a pair of substrates 101 and 101a, electrodes 102 and 102a each formed on the substrates 101 and 101a, adhesive layers 103 and 103a each disposed on the electrode 102 and 102a, and a display layer disposed between the adhesive layers $10^3$ and $10^3 a$. The display layer comprises a three-dimensional network structure 104, a polymer layer 105 covering the three-dimensional network structure 104, and a low-molecular weight mesomorphic compound 106 impregnating the covered or coated three-dimensional network structure.

The substrates 101 and 101a and the electrodes 102 and 102a may be constituted by materials identical to those described in the liquid crystal device of the first aspect of the present invention.

The adhesive layers 103 and 103a may be formed on the electrodes 102 and 102a, as desired. The adhesive layer comprises an adhesive such as a cyanoacrylate-type adhesive, a polyester acrylate-type adhesive, a chloroprene-type adhesive, a nitrile rubber adhesive, an epoxy-type adhesive, or a polyurethane-type adhesive. The adhesive may be selected depending on a substance coming in contact therewith. It is possible to dispose an insulating layer (not shown) and/or an alignment control layer (not shown), as desired. It is also possible to impart the adhesive layer or the insulating layer to an alignment-controlling force to the low-molecular weight mesomorphic compound.

The three-dimensional network structure may comprise a porous polymer film and a polymer 104 obtained through phase separation.

Examples of a porous polymer film may include: Hipore 1000, 2000, 3000, 4000 (manufactured by Asahi Kasei Kogyo K.K.); KT-50, LE-85, Duracard, Excepole (manufactured by Mitsubishi Kasei K.K.); Celpore (manufactured by Sekisui Kasei Kogyo K.K.); and Fluoropore (manufactured by Sumitomo Denki Kogyo K.K.). The polymer obtained through phase separation may be formed as follows. A uniform solution of a photopolymerizable compound and a low-molecular weight compound in an appropriate solvent is subjected to photopolymerization to effect phase separation, followed by extraction of the low-molecular weight compound to form a three-dimensional network structure. The three-dimensional network structure may also be formed by applying a dispersion of a low-molecular weight compound and a polymer incompatible with the low-molecular weight compound in an appropriate solvent onto an electrode plate optionally having thereon an adhesive layer, followed by drying and then extracting the low-molecular weight compound.

The phase separation-type polymer may include a polymer obtained through polymerization of a mixture comprising: a polymerizable compound such as styrene, chlorostyrene, divinylbenzene, an acrylate-type monomer, a methacrylate-type monomer or their oligomers; a polymerization initiator such as a carbonyl compound, a sulfur-containing compound, or a halogenated compound; a polymerization promoter optionally added; a low-molecular weight mesomorphic compound, e.g., comprising a commercially available nematic liquid crystal such as E-37 and E-44 (mfd. by BDH Co.), ZLI-2008 (mfd. by Merck Co.), or RO-TN-403 (mfd. by Rosch Co.). Examples of a polymer for the three-dimensional network structured formed by application of a dispersion may include polyurethane, polyamide, polyimide, polystyrene, polycarbonate and polymethacrylate. The polymer may be used in combination with a solid or liquid low-molecular weight compound incompatible with the polymer.

The polymer layer 105 is incompatible with the low-molecular weight mesomorphic compound 106 and may preferably comprise a polymer having a glass transition temperature of at least 50° C., particularly at least 80° C. and a softening temperature of at least 60° C., particularly 90° C. in order to improve a heat stability. More specifically, examples of such a polymer may include known thermoplastic resins or thermosetting resins such as polyurethane, polyamide, polyimide, polystyrene, polyacrylate, polymethacrylate, polysulfone, cellulose, polyvinylidene fluoride, polyvinyl chloride, polyamide-imide, polyfluorocarbon, a silicone resin, and a phenolic resin. The polymer may be used in combination with an additive, e.g., a plasticizer, as desired. The polymer layer may also be formed by polymerization of a polymerizable composition comprising a polymerizable compound such as an acrylate-type monomer or oligomer or a methacrylate-type monomer or oligomer; and a polymerization initiator such as Darocure 1173 and 1116 (mfd. by Merck Co.) or Kayacure DETX (mfd. by Nippon Kayaku K.K.).

In order to obtain a uniform polymer layer, the above-mentioned polymer may preferably be dissolved in a solvent such as alcohols, ketones, esters, aromatic hydrocarbons or water to prepare a solution having a viscosity of at most 300 cps, preferably at most 100 cps, more preferably at most 50 cps. The solution may be applied onto the three-dimensional network structure by coating, dipping, etc. The above-mentioned various polymers, polymerizable compositions and solvents can be used singly or in combination of two or more species. In the present invention, it is possible to effect various treatments such as heating, cooling, pressing, reduced pressure, as desired, during a step of coating or dipping the polymer layer. After formation of the polymer layer, it is possible to optionally effect washing or surface treatment. Further, the filling methods described in the embodiment according to the first aspect of the present invention may be applied for forming the polymer layer.

The low-molecular mesomorphic compound 106 is identical to the low-molecular weight mesomorphic compound 105 in the embodiment according to the first aspect of the present invention. The low-molecular weight mesomorphic compound 106 is contained in the three-dimensional network structure 104 having thereon the polymer layer 105 by impregnation under a normal pressure or reduced pressure or by a capillary-rise method, etc. A thickness of the display layer is the same as that of the display layer 103 in the embodiment according to the first aspect of the present invention.

In the first and second aspect of the present invention, a spacer (not shown in FIGS. 1 and 2) comprising substantially spherical particles of, e.g., glass, plastics, and ceramics may be used. The spacer has a diameter of 1.0–50 $\mu$m, preferably 2.0–20 $\mu$m. Below 0.1 $\mu$m, a scattering property as a transmission-scattering mode liquid crystal device becomes insufficient. Above 50 $\mu$m, a transmittance is undesirably decreased. The liquid crystal device according to the first or second aspect of the present invention may optionally include a thin film transistor (TFT) as a switch for electric field application. The liquid crystal device according to the present invention can be widely applied for various direct vision-type or projection-type liquid crystal display devices employing a transmission-scattering mode.

In the first and second aspects of the present invention described above, it is also possible to effect display by heating with a thermal head or laser light.

Examples of laser light may include: gas lasers such as He-Ne gas laser, $Ar^{2+}$ gas laser and $N_2$ gas laser; solid-state lasers such as ruby laser, glass laser and YAG laser; and semiconductor lasers. Among these lasers, a semiconductor laser having a wavelength of 600–1600 nm, particularly 600–900 nm may preferably be used. Further, it is possible to provide a lasers having a shorter wavelength by employing a second harmonic or third harmonic of these lasers.

When the laser light is used, the liquid crystal device further comprises a light absorption layer containing a laser light-absorbing substance or comprises a display layer dispersing or dissolving therein a laser light-absorbing substance. The laser light-absorbing substance may desirably show no absorption property in the region of visible light in view of a bad influence of the substance on a display surface.

Examples of such a laser light-absorbing substance may include: azo compounds, bisazo compounds, trisazo compounds, anthraquinone compounds, naphthoquinone compounds, phthalocyanine compounds, naphthalocyanine compounds, tetrabenzoporphyrin compounds, ammonium salt compounds, diimmonium salt compounds, and metal chelate compounds.

Among the laser light-absorbing substances, a substance for use in a semiconductor laser shows an absorption property in the region of near infrared ray and is usable for a stable light-absorbing dye. Such a substance also has a good compatibility with or dispersibility in the low-molecular weight mesomorphic compound. It is possible to obtain a thermally stable guest-host type memory or display medium by mixing a light-absorbing substance showing dichroism with the low-molecular weight mesomorphic compound.

The above-mentioned light-absorbing substances may be used singly or in combination of two or more species.

The substance may also be used in combination with another near infrared ray-absorbing dye or another dichroic dye.

Examples of such a near infrared ray-absorbing dye may include those such as cyanine, merocyanine, phthalocyanine, tetrahydrocholine, dioxazine, anthraquinone, triphenothiazine, xanthene, triphenylmethane, pyrilium, croconium, azulene and triphenylamine.

The above-mentioned light-absorbing substance is contained in the low-molecular weight mesomorphic compound in a proportion of 0.1–20%, preferably 0.5–10%.

FIGS. 3A and 3B show another structural embodiment of the liquid crystal device of the first or second aspect of the present invention, wherein FIG. 3A is a schematic plan view of the device and FIG. 3B is a schematic A—A' line-sectional view of the device.

Referring to FIGS. 3A and 3B, the liquid crystal device of the present invention includes a pair of substrates 1 and 1a comprising a glass plate or a plastic plate and held to have a prescribed (but arbitrary) gap with a spacer 4. The periphery of the substrates 1 and 1a is sealed up with an adhesive 6 such as an epoxy resin. On the substrate 1a, plural transparent electrodes 2a (e.g., electrodes for applying scanning voltage) with a prescribed pattern, e.g., in the form of stripes, are formed. On the other hand, plural transparent electrodes 2 (e.g., electrodes for applying signal voltage) with a reflection layer perpendicular to the electrodes 2a are formed on the substrate 1. It is possible to dispose a thin film transistor (TFT) on the substrate 1 and/or 1a.

Referring to FIG. 2B, a display layer 3 is disposed between the substrates 1 and 1a having the transparent electrodes 2 and 2a, respectively, thereon. In this embodiment, an alignment control layer may be formed on the transparent electrode.

The alignment control layer formed on the substrate 1a with the electrode 2a thereon may include: inorganic materials such as silicon monoxide, silicon dioxide, aluminum oxide, zirconia, magnesium fluoride, cerium oxide, cerium fluoride, silicon nitride, silicon carbide, and boron nitride; and organic materials such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, acrylic resin, and epoxy resin. Each of the alignment control layers may be formed by rubbing a film of the inorganic or organic material-described above with velvet, cloth or paper in one direction so as to provide a uniaxial alignment characteristic. Further, it is possible to compose the alignment control layer of two layers, e.g., by first forming a layer of the inorganic material and forming thereon a layer of an organic material. In still another embodiment, it is possible to form an alignment control layer on a substrate by oblique vapor deposition with the inorganic material such as SiO or $SiO_2$. It is also possible to impart an alignment-controlling effect to a substrate such as one comprising glass or plastic by effecting oblique etching after providing an inorganic or organic material on the substrate. The use of the alignment control layer is effective for uniformly aligning the porous polymer film material or the three-dimensional network structure in one direction.

The alignment control layer may preferably be used also as an insulating layer. Accordingly, the thickness of the alignment control layer may generally have 100 Å–1 micron, preferably 500–5000 Å. The insulating layer also has the advantage of preventing current conduction due to a trace impurity in the display layer 3, whereby the display layer little deteriorate even in a repetitive operation. In the present invention, the alignment control layers may be formed on the transparent electrodes 2 and 2a, respectively.

The display apparatus of the present invention includes the above-mentioned liquid crystal device of the first or second aspect of the present invention, means for emitting light, means for applying voltage to the device, and means for projecting transmitted light onto a screen.

Figure 4:
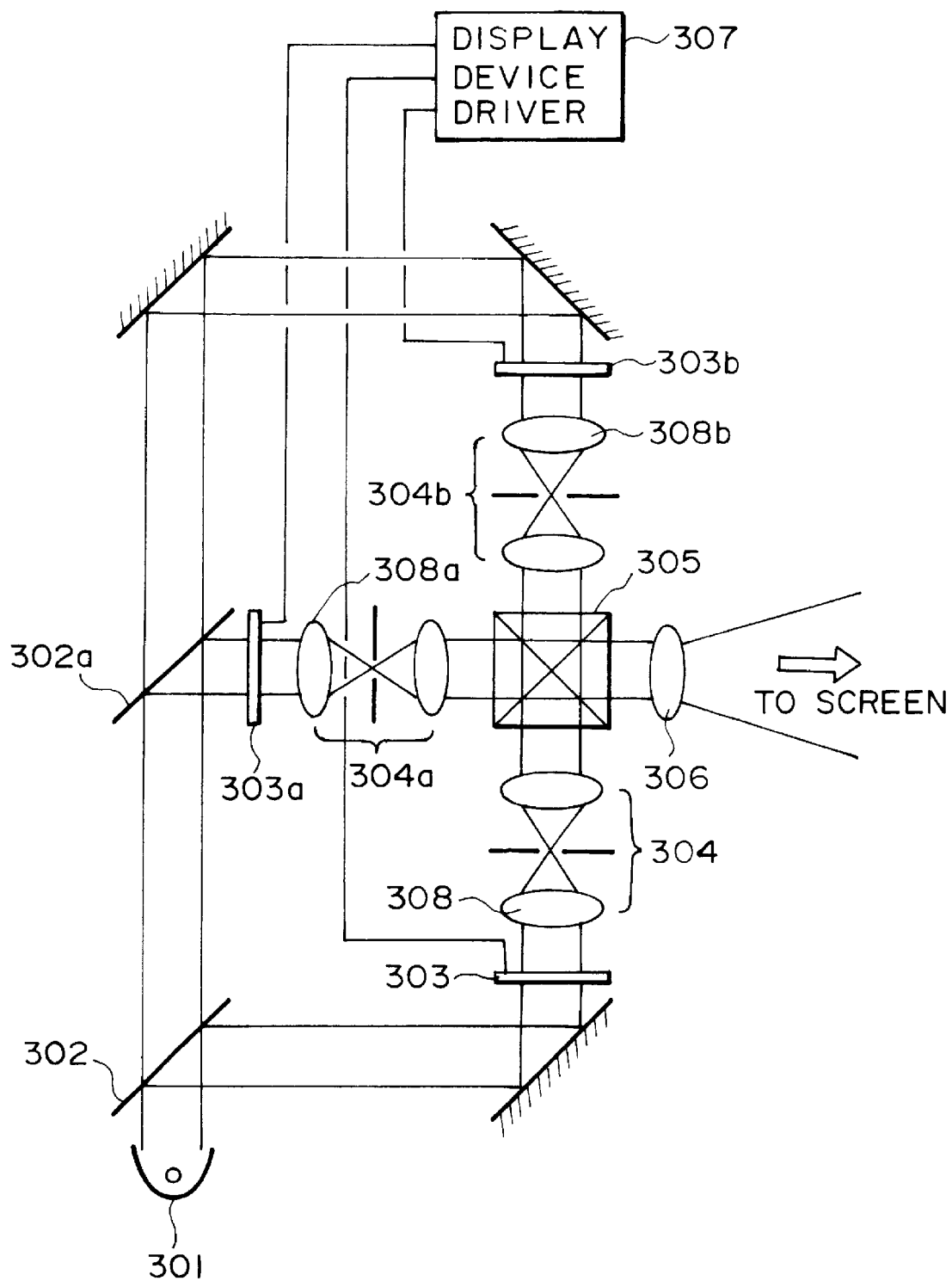
FIG. 4 is an explanatory view of a display apparatus employing the liquid crystal device according to the present invention.

FIG. 4 shows an explanatory view of an embodiment of the display apparatus of the present invention. The display apparatus is a full-color projection-type display apparatus employing a schlieren optical system.

Referring to FIG. 4, white light emitted by a light source unit 301 is separated into light fluxes having three primary colors of R (red), G (green) and B (blue) by dichloic mirrors 302 and 302a to be projected to liquid crystal devices 303, 303a and 303b. A non-selected picture element in the device is turned into a white scattering state to scatter the incident light and a selected picture element is allowed to transmit the incident light. The transmitted light fluxes and the scattered light fluxes are separated by schlieren optical systems 304, 304a and 304b including schlieren lenses 308, 308a and 308b, and then are combined by a dichloic prism 305 to be projected onto a projection image-receiving member such as a screen (not shown) through a projection lens 306, whereby good full-color images can be obtained. The liquid crystal devices 303, 303a and 303b are supplied with voltage by a driving unit 307 for driving the liquid crystal devices. The liquid crystal devices in this embodiment can employ a simple matrix system or a non-linear optical device, but may more preferably be a type comprising a thin film transistor (TFT) as a switch for each picture element in view of display contrast, response speed and gradation display.

Hereinbelow, the present invention will be explained in more detail with reference to Examples.

EXAMPLE 1

A porous polymer material having a thickness of 23 microns (EXCEPOLE E BSP BX-4, manufactured by Mitsubishi Kasei K.K.) was applied to a 1.1 mm-thick glass substrate having thereon a vapor-deposited 2000 A-thick ITO electrode by using an epoxy-type adhesive under heating. The above-prepared laminated substrate was installed in a plasma polymerization apparatus and subjected to plasma polymerization (discharge frequency=10 KHz, power=100 W, degree of vacuum=100 Pa) for 30 minutes while introducing ethane gas at a flow rate of 70 STP ml/min.

The thus-treated porous polymer material was subjected to observation with an SEM, whereby a minute pore portion having a pore diameter of at most 0.5 μm in the neighborhood of a node was filled with a polymer formed by the plasma polymerization.

The thus-treated substrate was applied to another glass substrate having an ITO electrode identical to the above-mentioned glass substrate, followed by sealing of the periphery thereof with an epoxy-type adhesive containing glass fiber spacers (20 μmø, mfd. by Nippon Denki Garasu K.K.) so as to leave a open side, whereby a blank cell was prepared. A nematic liquid crystal (ZLI-2008 (Ex. Comp. No. I-36), mfd. by Merck Co.) was injected into the blank cell by a capillary-rise method under reduced pressure, followed by restoration to normal pressure to effect impregnation or filling of a low-molecular weight mesomorphic compound (I-36), whereby a liquid crystal device comprising a display layer was prepared.

When the above-prepared liquid crystal device was subjected to pulse voltage application (rectangular waveform of 60 Hz and ±100 V), the display layer changed from a white scattering state (under no voltage application) into a transparent state to provide a transmittance of 37% (measured value by using a tungsten (W) lamp) and a contrast at 20:1.

Comparative Example 1

A liquid crystal device was prepared and evaluated in the same manner as in Example 1 except for omitting the plasma polymerization treatment, whereby a transmittance of 30% and a contrast of 10:1 were obtained.

EXAMPLE 2

A laminated substrate was prepared in the same manner as in Example 1 except that the porous polymer material was changed to a porous polymer material having a thickness of 50 microns (HIPORE 3000, porosity=90%, mfd. by Asahi Kasei Kogyo K.K.).

Subsequently, the following monomer mixture was prepared.

| 1,6-hexanediol diacrylate | 50 wt. parts |
| benzyl acrylate | 50 wt. parts |
| 1-hydroxycyclohexylketone | 1 wt. part |

The above monomer mixture was dissolved in methanol to obtain a 3 wt. %-solution of the monomer mixture in methanol. The porous polymer material of the above-prepared laminated substrate was impregnated or filled with the solution, followed by drying at 40° C. to remove the solvent.

Then, the thus-treated laminated substrate was subjected to exposure to ultraviolet rays from a high-pressure mercury lamp (power=500 W, irradiation distance=20 cm) for 3 minutes to effect polymerization.

The thus-treated porous polymer material was subjected to observation with an SEM in the same manner as in Example 1, a minute pore portion having a pore diameter of at most 0.5 μm in the neighborhood of a node was filled with a polymer formed by the polymerization.

A black cell was prepared in the same manner as in Example 1 by using the above-treated laminated substrate and then the porous polymer material was impregnated with a nematic liquid crystal (ZLI-2008) in the same manner as in Example 1 to prepare a liquid crystal device.

The liquid crystal device was evaluated in the same manner as in Example 1 except that an applied voltage was changed from ±100 V to ±200 V, whereby a transmittance of 34% and a contrast of 15:1 were obtained.

Comparative Example 2

A liquid crystal device was prepared and evaluated in the same manner as in Example 2 except for omitting the impregnation (or filling) with the solution of the monomer mixture, whereby a transmittance of 28% and a contrast of 10:1 were obtained.

As apparent from the above Examples 1 and 2 and Comparative Examples 1 and 2, when a porous polymer film material which has been subjected to sealing is impregnated (or filled) with a low-molecular weight mesomorphic compound to prepare a liquid crystal device according to the present invention, a display layer of the liquid crystal device has no unfilled portion of the low-molecular weight, thus improving a light transmittance and a contrast.

EXAMPLE 3

A blank cell for forming a display layer comprising a low-molecular weight mesomorphic compound (or liquid crystal) and a three dimensional network structure was prepared as follows.

Onto a 1.1 mm-thick glass substrate (20×20 mm square) having thereon a vapor-deposited layer comprising a 1000 Å-thick ITO, a solution of an epoxy-type adhesive (Struct Bond, EH-454NF, mfd. by Mitsui Toatu Kagaku K.K.) in MEK was applied by spin coating and then a 125 micron-thick porous film (12×18 mm; porosity=85%; average pore size=10 μm; mfd. by Millipore Corp.) was laminated on the resultant substrate, followed by heating for adhesion.

Then, the above-prepared substrate was impregnated or saturated with a solution of polystyrene (Mw=280,000; mfd. by Aldrich Co.) in benzene, followed by drying. The porous film was ground by means of a grinder to provide a thickness (i.e., a thickness of a display layer) of 10 microns and then was subjected to ultrasonic cleaning with benzene to remove the polystyrene, whereby a three-dimensional network structure on the electrode plate was obtained.

Separately, a three-dimensional network structure identical to the above-prepared three-dimensional network structure was prepared and subjected to observation of a scanning electron microscope (SEM, magnification of 5,000), whereby a minute fibrous part having a diameter of at most 0.05 μm was considerably observed.

Then, the above-mentioned three-dimensional network structure (not subjected to the SEM observation) was impregnated or filled with a solution of 0.5%-polyacrylic acid (Mw,=1,000,000, mfd. by Aldrich Co.) in methanol, followed by drying to obtain a three-dimensional structure coated with a polymer layer. The polymer layer had a thickness of 0.2–2 μm.

Then, another glass substrate having thereon a 1000 Å-thick vapor-deposited ITO layer was applied onto the above-prepared three-dimensional network structure formed on the substrate with an adhesive comprising a small amount of a glass fiber spacer (10 micron ø, manufactured by Nippon Denki Garasu K.K.), followed by heat curing to provide a blank cell.

Into the above-prepared cell, a nematic liquid crystal (composition) E-37 (mfd. by BDH Co.) was injected by a capillary-rise method under reduced pressure, followed by restoration to normal pressure to effect impregnation of the three-dimensional network structure with the liquid crystal E-37, whereby a liquid crystal device was prepared. A liquid crystal content in the display layer was calculated by measuring weight of the blank cell before and after impregnation to provide 75%.

The liquid crystal device was subjected to pulse voltage application (rectangular waveform of 60 Hz and ±40 V), whereby the display layer changed from a scattering state (under no voltage application) into a transparent state to provide a transmittance of 51% and a contrast of 12:1.

An voltage was applied upward to the liquid crystal device from 0 V to ±50 V and then was applied downward from ±50 V to 0 V, whereby a difference in a light transmittance was a slightly observed to obtain a hysteresis of 8%.

Herein, a value of hysteresis is defined as the following equation:

Hysteresis (%)=$\Delta T/T \times 100$, wherein T denotes a value of a light transmittance at a variation rate of 50% with respect to a light transmittance when a voltage is applied upward, and dT denotes an increment of a light transmittance at an applied voltage providing the above variation rate of 50% when a voltage is applied downward.

Comparative Example 3

A liquid crystal device was prepared and evaluated in the same manner as in Example 3 except that the polymer layer was not formed, whereby the display layer changed from a scattering state (under no voltage application) into a transparent state to provide a transmittance of 56% and a contrast of 8:1. Further, the device showed a change in a transmittance when an upward voltage application and a downward voltage application was effected, whereby a hysteresis of 25% was obtained.

EXAMPLE 4

Between a pair of 1.1 mm-thick glass plates each having thereon a vapor-deposited layer comprising a 1000 Å-thick ITO electrode; a mixture of 14 wt. parts of dipentaerythritol hexaacrylate (Aronics M-402, mfd. by Toa Gosei K.K.), 0.2 wt. part of Kayacure DETX (mfd. by Nipon Kayaku K.K.), 0.2 wt. part of Kayacure EPA (mfd. by Nippon Kayaku K.K.) and 86 wt. parts of a nematic liquid crystal ZLI-2008 (mfd. by Merck Co.), and a small amount of a glass fiber spacer (10 µmø, mfd. by Nippon Denki Garasu K.K.) added in the mixture were disposed to prepare a cell.

The cell was irradiated with ultraviolet rays from a high-pressure mercury lamp to cure a monomer component, followed by ultrasonic cleaning with methanol to remove the nematic liquid crystal ZLI-2008, thus providing a three-dimensional network structure.

The thus-treated cell was dipped into an aqueous solution of 0.5 wt. %-polyvinyl alcohol (Gosenol NH-18, mfd. by Nippon Gosei Kagaku K.K.) in water and dried under heating, followed by washing with an appropriate amount of water to remove an excessive polyvinyl alcohol and then curing for 30 minutes at 150° C. in an oven.

Then, a nematic liquid crystal ZLI-2008 (mfd. by Merck Co.) was injected into the above cell in the same manner as in Example 1 to prepare a liquid crystal device having a display layer. A liquid crystal content of 86% was obtained in the same manner as in Example 3.

The liquid crystal device was subjected to pulse voltage application (rectangular waveform of 60 Hz and ±20 V), whereby the display layer changed from a scattering state (under no voltage application) into a transparent state to provide a transmittance of 46% and a contrast of 8:1.

An voltage was applied upward to the liquid crystal device from 0 V to ±30 V and then was applied downward from ±30 V to 0 V to obtain a hysteresis of 18%.

Comparative Example 4

Between a pair of 1.1 mm-thick glass plates each having thereon a vapor-deposited layer comprising a 1000 Å-thick ITO electrode; a mixture of 28 wt. parts of dipentaerythritol hexaacrylate (Aronics M-402, mfd. by Toa Gosei K.K.), 0.5 wt. part of Kayacure DETX (mfd. by Nipon Kayaku K.K.), 0.5 wt. part of Kayacure EPA (mfd. by Nippon Kayaku K.K.) and 71 wt. parts of a nematic liquid crystal ZLI-2008 (mfd. by Merck Co.), and a small amount of a glass fiber spacer (10 µmø, mfd. by Nippon Denki Garasu K.K.) added in the mixture were disposed to prepare a cell.

The cell was irradiated with ultraviolet rays from a high-pressure mercury lamp to cure a monomer component, thus effecting phase separation to disperse the nematic liquid crystal ZLI-2008 in a three-dimensional network structure.

An voltage was applied upward to the above-prepared liquid crystal device from 0 V to ±50 V and then was applied downward from ±50 V to 0 V, whereby a difference in a light transmittance was considerably observed to obtain a hysteresis of 34%.

Comparative Example 5

A mixture comprising the following monomers and compounds was prepared.

| | |
|---|---|
| TPA-330 (mfd. by Nippon Kayaku K.K.) | 6 wt. parts |
| M-117 (mfd. by Toa Gosei K.K.) | 4 wt. parts |
| 2-methyl-1-phenyl-propane-1-one | 0.2 wt. part |
| ZLI-2008 (mfd. by Merck Co.) | 40 wt. parts |

Into a blank cell formed by applying a pair of glass plates each having thereon an ITO electrode each other by an adhesive containing a glass fiber spacer (50 µmø), the above mixture was injected, followed by irradiation with ultraviolet rays to effect polymerization, thus providing a liquid crystal device. A solubility parameter of a polymer component was 10 $(cal/cm^3)^{1/2}$.

The liquid crystal device was subjected to pulse voltage application (rectangular waveform of 60 Hz and ±40 V), whereby the display layer changed from a scattering state (under no voltage application) into a transparent state to provide a contrast of 10:1 and a hysteresis of 35%.

As apparent from the above Examples 3 and 4 and Comparative Examples 3–5, the liquid crystal devices containing a three-dimensional network structure coated with the polymer layer according to the present invention showed a decreased hysteresis, a high transmittance and a good contrast compared with the liquid crystal devices lacking such a three-dimensional network structure.

EXAMPLE 5

A 50 μm-thick porous film (HIPORE 3000, porosity 90%, mfd. by Asahi Kasei Kogyo K.K.) was impregnated with an aqueous solution of 3%-polyvinyl alcohol (Gosenol NH=18, mfd. by Nippon Gosei Kagaku K.K.) in water, followed by drying to remove an excessive polyvinyl alcohol aqueous solution.

The resultant porous film was applied onto a 1.1 mm-thick glass substrate having thereon a vapor-deposited 2000 Å-thick ITO electrode by using an epoxy-type adhesive, followed by curing for 1 hour at 120° C.

Then, the above-prepared substrate was impregnated or saturated with a solution of polystyrene (Mw=280,000) in benzene, followed by drying. The porous film was ground by means of a grinder to provide a thickness (i.e., a thickness of a display layer) of 10 microns and then removed the polystyrene, whereby a three-dimensional network structure on the electrode plate was obtained.

Separately, a three-dimensional network structure identical to the above-prepared three-dimensional network structure was prepared and subjected to observation of an SEM in the same manner as in Example 1), whereby a minute pore portion having a pore diameter of at most 0.5 μm was filled.

Then, the above-mentioned three-dimensional network structure (not subjected to the SEM observation) was impregnated or filled with a solution of 0.5%-polyacrylic acid (Mw=1,000,000, mfd. by Aldrich Co.) in methanol, followed by drying to obtain a three-dimensional structure coated with a polymer layer. The polymer layer had a thickness of 0.2 μm at a center of a fibril.

Then, another glass substrate having thereon a 2000 Å-thick vapor-deposited ITO layer was applied onto the above-prepared three-dimensional network structure formed on the substrate with an adhesive comprising a small amount of a glass fiber spacer (10 micron ø, manufactured by Nippon Denki Garasu K.K.), followed by heat curing to provide a blank cell.

Into the above-prepared cell, a nematic liquid crystal (composition) E-37 (mfd. by BDH Co.) was injected by a capillary-rise method under reduced pressure, followed by restoration to normal pressure to effect impregnation of the three-dimensional network structure with the liquid crystal E-37, whereby a liquid crystal device was prepared. A liquid crystal content in the display layer was calculated by measuring weight of the blank cell before and after impregnation to provide 85%.

The liquid crystal device was subjected to pulse voltage application (rectangular waveform of 60 Hz and +35 V), whereby the display layer changed from a scattering state (under no voltage application) into a transparent state to provide a transmittance of 53% and a contrast of 14:1.

An voltage was applied upward to the liquid crystal device from 0 V to ±50 V and then was applied downward from ±50 V to 0 V, whereby a difference in a light transmittance was a slightly observed to obtain a hysteresis of 7%.

What is claimed is:

1. A liquid crystal device, comprising:
a pair of electrode plates each comprising a substrate and an electrode thereon, and a display layer disposed between the electrode plates;
said display layer comprising a porous polymer material having open pores, a portion of said open pores containing a filling substance and the remaining portion of said open pores containing a low-molecular weight mesomorphic compound other than said filling substance.

2. A device according to claim 1, wherein said open pores have a pore diameter of at most 0.5 μm.

3. A device according to claim 1, wherein said porous polymer material has a porosity of 80 to 98%.

4. A display apparatus, including:
a display device according to any one of claims 1, 2 or 3;
means for applying voltage to said display device;
means for illuminating said display device with light, thereby separating said light into transmitted light and scattered light; and
means for projecting said transmitted light passed through said display device onto a projection image-receiving member.

5. A liquid crystal device according to claim 1, wherein said filling substance comprises a material having a solubility parameter of at least 12 $(cal/cm^3)^{1/2}$.

6. A device according to claim 5, wherein said open pores containing said material having a solubility parameter of at least 12 $(cal/cm^3)^{1/2}$ have a pore diameter of at most 0.5 μm.

7. A device according to claim 5, wherein said porous polymer material has a porosity of 80 to 98%.

8. A display apparatus, including:
a display device according to any one of claims 5–7;
means for applying voltage to said display device;
means for illuminating said display device with light, thereby separating said light into transmitted light and scattered light; and
means for projecting said transmitted light passed through said display device onto a projection image-receiving member.

9. A liquid crystal device, comprising:
a pair of electrode plates each comprising a substrate and an electrode thereon, and a three-dimensional network structure disposed between the pair of electrode plates, wherein
said three-dimensional network structure has open pores providing surfaces, and said surfaces are coated with a polymer layer to leave a space which is filled with a low-molecular weight mesomorphic compound.

10. A device according to claims 9, wherein said polymer layer has a thickness of 0.2 to 2 μm.

11. A device according to claim 9, wherein said polymer layer shows a solubility parameter of as least 12 $(cal/cm^3)^{1/2}$.

12. A device according to claim 5, wherein said three-dimensional network structure comprises a stretched porous polymer film having a porosity of 80 to 98%.

13. A display apparatus, including:
a display device according to any one of claims 9–12;
means for applying voltage to said display device;
means for illuminating said display device with light, thereby separating said light into transmitted light and scattered light; and
means for projecting said transmitted light passed through said display device onto a projection image-receiving member.

14. A process for producing a liquid crystal device comprising a pair of electrode plates each comprising a substrate and an electrode thereon, and a display layer disposed between the electrode plates comprising a porous polymer material having open pores; said process comprising the steps of:

filling a portion of said open pores with a filling substance, and then filling the remaining portion of said open pores with a low-molecular weight mesomorphic compound other than said filling substance.

15. A process according to claim 14, wherein said filling substance comprises a material having a solubility parameter of at least 12 $(cal/cm^3)^{1/2}$.

* * * * *

UNITED STATES PATENT AND TRADEMARK OFFICE
CERTIFICATE OF CORRECTION

PATENT NO. : 5,812,227

DATED : September 22, 1998

INVENTOR(S): YOMISHI TOSHIDA ET AL.

It is certified that error appears in the above-identified patent and that said Letters Patent is hereby corrected as shown below:

<u>ON COVER PAGE AT [56] REFERENCES CITED FOREIGN PAGENT DOCUMENTS</u>

"01198725" should read --1-198725--;
"01225924" should read --1-225924--;
"02280120" should read --2-280120--;
"04081716" should read --4-081716--.

<u>ON COVER PAGE AT [57] ABSTRACT</u>

Line 10, "three dimensional" should read
  --three-dimensional--.

<u>COLUMN 1</u>

Line 32, "device," should read --devices,--;
Line 34, "those as" should read --as those--;
Line 66, "to-scatter" should read --to scatter--.

<u>COLUMN 2</u>

Line 22, "liquid-crystal" should read --liquid crystal--;
Line 51, "has" should read --have--;
Line 52, "effect," should read --effected,--.

<u>COLUMN 3</u>

Line 42, "tion" should read --ting--.

UNITED STATES PATENT AND TRADEMARK OFFICE
CERTIFICATE OF CORRECTION

PATENT NO. : 5,812,227

DATED : September 22, 1998

INVENTOR(S): YOMISHI TOSHIDA ET AL.

It is certified that error appears in the above-identified patent and that said Letters Patent is hereby corrected as shown below:

COLUMN 4

Line 41, "Myler"," should read --Mylar",--;
Line 55, ""Tedler"," should read --"Tedlar",--.

COLUMN 5

Line 24, "as," should read --as--;
Line 46, "reference" should read --referred--.

COLUMN 6

Line 39, "parameters" should read --parameter--;
Line 53, "has" should read --have--.

COLUMN 8

Line 23, "un-identified" should read --unidentified--.

COLUMN 13

Composition (I-24), "di-n-octy-4," should read
  --di-n-octyl-4,--.

COLUMN 15

Composition (I-30), "4-cyano-4 hexylterphenyl" should read
  --4-cyano-4-hexylterphenyl--.

UNITED STATES PATENT AND TRADEMARK OFFICE
CERTIFICATE OF CORRECTION

PATENT NO. : 5,812,227

DATED : September 22, 1998

INVENTOR(S): YOMISHI TOSHIDA ET AL.

It is certified that error appears in the above-identified patent and that said Letters Patent is hereby corrected as shown below:

COLUMN 17

Line 60, "electro" should read --electron--;
Line 64, "each" should read --each of--.

COLUMN 18

Line 29, "fails" should read --fail--;
Line 31, "has" should read --have--;
Line 48, "$0.2 \times 10^4 20 \times 10^4$ kg/cm$^2$," should read
  --$0.2 \times 10^4 - 20 \times 10^4$ kg/cm$^2$,--;
Line 64, "second" should read --the second--.

COLUMN 19

Line 2, "electrode 102" should read --electrodes 102--;
Line 3, "layers $10^3$" should read --layers 103--;
Line 4, "$10^3$a." should read --layers 103a.--;
Line 23, "impart" should read --impart to--;
Line 24, "to" (first occurrence) should be deleted;
Line 24, "to" (second occurrence) should read --orient--;

Line 60, "structured" should read --structure--.

UNITED STATES PATENT AND TRADEMARK OFFICE
CERTIFICATE OF CORRECTION

PATENT NO. : 5,812,227

DATED : September 22, 1998

INVENTOR(S): YOMISHI TOSHIDA ET AL.

It is certified that error appears in the above-identified patent and that said Letters Patent is hereby corrected as shown below:

COLUMN 21

Line 3, "lasers" should read --laser--;
Line 60, "FIG. 2B," should read --FIG. 3B,--.

COLUMN 22

Line 29, "deteriorate" should read --deteriorates--;
Line 43, "dichloic" should read --dichroic--;
Line 51, "dichloic" should read --dichroic--.

COLUMN 24

Line 33, "three dimensional" should read
  --three-dimensional--.

COLUMN 25

Line 19, "An" should read --A--;
Line 22, "a" (first occurrence) should read should be
  deleted--;
Line 31, "dT" should read --$\Delta$T--.

COLUMN 26

Line 13, "An" should read --A--;
Line 33, "An" should read --A--.

UNITED STATES PATENT AND TRADEMARK OFFICE
CERTIFICATE OF CORRECTION

PATENT NO. : 5,812,227

DATED : September 22, 1998

INVENTOR(S): YOMISHI TOSHIDA ET AL.

It is certified that error appears in the above-identified patent and that said Letters Patent is hereby corrected as shown below:

COLUMN 27

Line 25, "Example 1)," should read --Example 1,--;
Line 55, "An" should read --A--;
Line 58, "a" (first occurrence) should be deleted.

COLUMN 28

Line 45, "claims 9," should read --claim 9,--;
Line 49, "claim 5," should read --claim 9,--.

Signed and Sealed this

Twentieth Day of July, 1999

Attest:

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,812,227

DATED : September 22, 1998

INVENTOR(S) : Yomishi Toshida et al.

It is certified that error appears in the above-identified patent and that said Letters Patent is hereby corrected as shown below:

COLUMN 26

Line 50, "applying" should read --injecting, to--.
Line 51, "each" (second occ.) should read --intersecting each--
Line 53, "was injected" should be deleted.

Signed and Sealed this

Seventh Day of September, 1999

Q. TODD DICKINSON

Attest:

Attesting Officer

Acting Commissioner of Patents and Trademarks